(No Model.)
L. C. WILCOX.
BIT BRACE.
No. 428,984. Patented May 27, 1890.
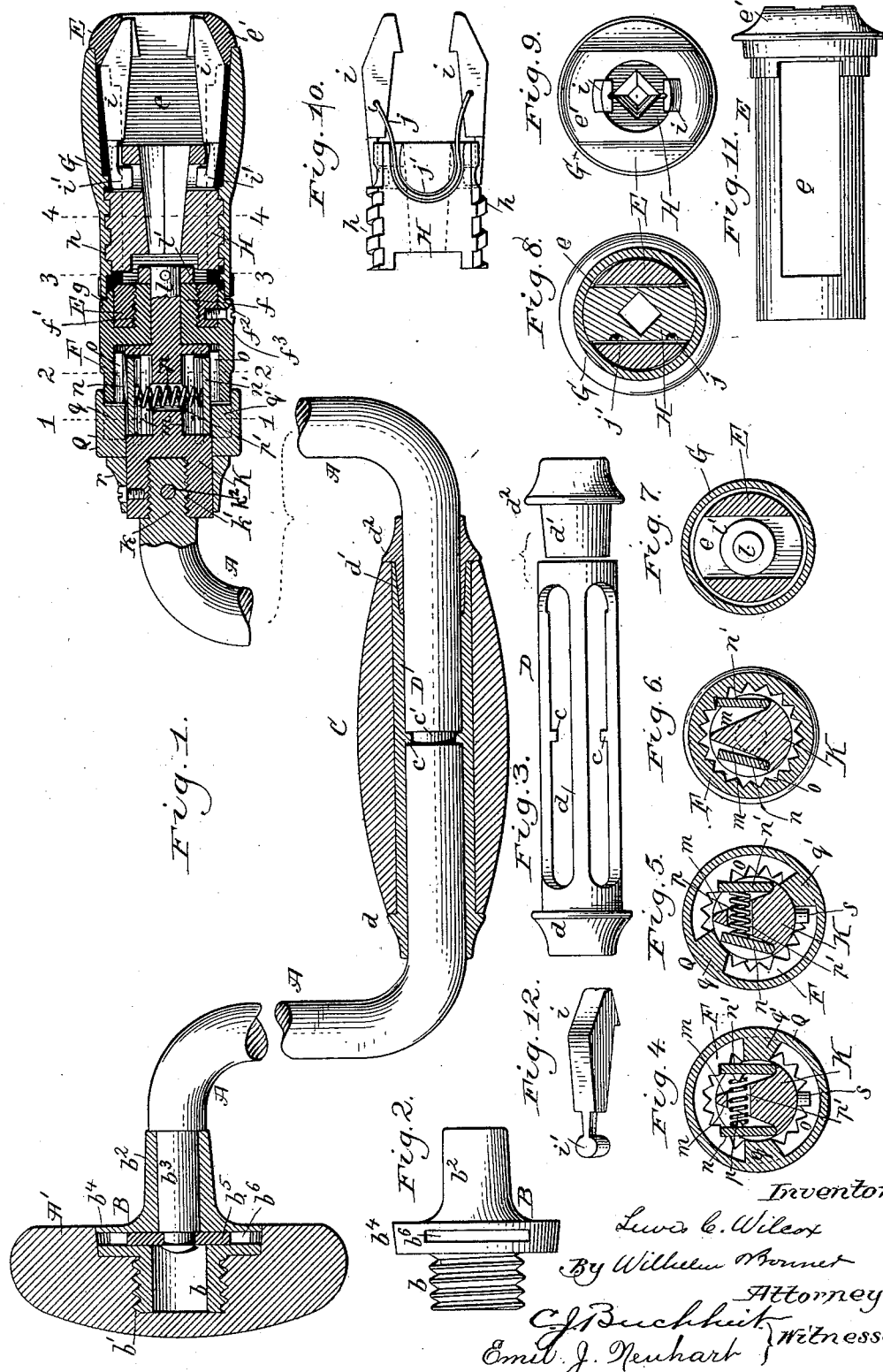
Inventor:
Lewis C. Wilcox
By Wilhelm Bonner
Attorneys
Witnesses:
C. J. Buchheit
Emil J. Neuhart

UNITED STATES PATENT OFFICE.

LEWIS C. WILCOX, OF BUFFALO, NEW YORK, ASSIGNOR TO THE AMERICAN BIT BRACE COMPANY, OF SAME PLACE.

BIT-BRACE.

SPECIFICATION forming part of Letters Patent No. 428,984, dated May 27, 1890.

Application filed December 23, 1889. Serial No. 334,636. (No model.)

*To all whom it may concern:*

Be it known that I, LEWIS C. WILCOX, a citizen of the United States, residing at Buffalo, in the county of Erie and State of New York, have invented new and useful Improvements in Bit-Braces, of which the following is a specification.

This invention relates more especially to improvements in ratchet-braces, and has for its object, first, to improve the means for attaching the head to the sweep, so as to give the head a large bearing-surface; second, to attach the handle to the crank in a simple manner and to reduce wear thereof; third, to improve the bit centering and gripping mechanism of the stock, and, fourth, to improve the ratchet mechanism and simplify the means whereby the brace is converted into a right-hand or left-hand brace or to an ordinary brace.

In the accompanying drawings, Figure 1 is a sectional elevation of a bit-brace embodying my improvements. Fig. 2 is an elevation of the thimble whereby the head is connected to the sweep. Fig. 3 is an elevation of the bushing of the actuating-handle. Figs. 4 and 5 are cross-sections of the stock in line 1 1, Fig. 1, looking toward the right and showing different positions of the pawls of the ratchet mechanism. Fig. 6 is a cross-section in line 2 2, Fig. 1, looking toward the right. Fig. 7 is a similar section in line 3 3, Fig. 1, looking toward the left. Fig. 8 is a cross-section of the stock in line 4 4, Fig. 1, looking toward the right. Fig. 9 is an end view of the bit-stock. Fig. 10 is a detached elevation of the clamping-jaws and the block or follower carrying the same. Fig. 11 is a detached elevation of the cylindrical socket or barrel of the stock. Fig. 12 is a perspective view of one of the gripping-jaws.

Like letters of reference refer to like parts in the several figures.

A represents the sweep, A' the wooden head or button, and B a thimble or sleeve whereby the head is attached to the outer end of the sweep. The thimble B is provided at its inner end with an externally-threaded nipple $b$, which engages in a threaded socket $b'$, formed in the inner side of the head A'. The inner portion of the thimble is formed with a socket or opening $b^2$, in which the contracted end portion $b^3$ of the sweep is journaled.

$b^4$ represents an annular flange or collar formed on the thimble B between the nipple $b$ and socket $b^2$, and which fits in a recess or enlargement at the outer end of the socket of the head A', the shoulder formed at the junction of said recess and the socket bearing against the inner face of said flange or collar when the head is screwed upon the thimble.

$b^5$ represents a washer secured to the outer end of the sweep, arranged in a transverse slot or opening $b^6$, formed in the flange $b^4$ and extending through the thimble. The washer is secured to the sweep, preferably, by threading or upsetting the end of the latter, as represented in Fig. 1. In attaching the head to the sweep the washer is placed in the slot $b^6$ with its opening communicating with the socket $b^2$ of the thimble. The reduced end of the sweep is then passed through the socket of the thimble and the washer, and the projecting end of the sweep is upset by inserting a tool through the opening in the outer end of the thimble. After the parts have been thus connected the wooden head is screwed upon the threaded nipple $b$. The thimble is free to revolve upon the end of the sweep and is confined between the washer and the shoulder formed at the inner contracted portion of the sweep. The washer affords a large bearing-surface for the shank within the thimble and receives the greater portion of the wear, thereby protecting the wooden head and increasing the durability thereof.

C represents the handle arranged upon the crank of the sweep, and D is a bushing or sleeve arranged within the bore of the handle and surrounding the crank. The bushing D is provided at one end with a collar or shoulder $d$. $d'$ is a tapering thimble, sleeve, or plug, which is driven into the opposite end of the bushing and provided with an annular rim or shoulder $d^2$. The handle C is confined on the bushing between the shoulders $d$ $d^2$.

The bushing D is made open, as represented in Fig. 3, to render it light, and is provided with inwardly-projecting lugs or teats $c$, which enter an annular groove $c'$, formed in the crank, and thereby hold the bushing against lengthwise movement on the crank while allowing it to turn on the same. The bushing is placed over the sweep before the latter is bent, and the arms or solid portions *d* of the bushing, which carry the lugs *c*, are sprung outwardly in passing the bushing over the sweep, the arms springing inwardly to their normal position when the lugs arrive opposite the groove and causing the same to enter the groove. If the arms are not sufficiently elastic for this purpose, they may be compressed by a suitable tool. After the bushing has been attached to the sweep the handle is slipped over the bushing and secured thereto by driving the tapering sleeve *d* into the end of the bushing. The metallic bushing entirely relieves the handle from wear, preventing the bore of the handle from wearing oval, which occurs when the wooden handle itself is journaled on the sweep.

E represents the cylindrical socket or barrel of the stock, provided with a longitudinal slot *e* and having at its outer end an annular rim or head *e'*.

F represents an annular ratchet ring or chamber arranged at the inner end of the socket E, and provided with a screw-threaded stem *f*, which engages in a screw-threaded opening *f'* at the inner end of the socket. The ratchet-ring is held against turning on the socket by a screw $f^2$, arranged in a projecting rim $f^3$, formed at the outer end of the ring and engaging in a threaded opening in the inner end of the socket.

G represents a rotary sleeve surrounding the socket or barrel E, and which is held against lengthwise movement on the barrel by the head *e'* on the barrel and a shoulder *g*, formed at the outer end of the ring F.

H represents a movable block or follower arranged in the slot of the socket E and projecting beyond the side of the barrel. This block is provided with external screw-threads *h*, which engage with an internal thread formed on the rotary sleeve G. The block is held against turning in the slot of the barrel, but is free to move lengthwise in the slot upon turning the sleeve G. The block is provided centrally with a square tapering socket for receiving the tang of the bit.

*i i* represent the jaws arranged in the outer portion of the stock, and which are provided at their inner ends with cylindrical heads or knuckles *i'*, which fit loosely in the block H.

*j* is a bow-spring attached with its ends to the jaws *i i* and arranged with its bow or bent portion in a U-shaped groove or recess *j'*, formed in the block H, as represented in Fig. 10. This spring tends to press the jaws outwardly. The outer faces of the jaws are beveled or inclined, as shown, and the adjacent inner portion of the head *e'* of the socket E is correspondingly inclined to cause the jaws to approach each other upon moving the block H outwardly. The bit is seated with the inner end of its tang in the socket of the movable block H, and is gripped in advance of the block by the jaws. The bit is thus clamped at two points in the stock and firmly held therein.

K represents a cylindrical head or block whereby the barrel or socket E is connected with the threaded end or shank *k* of the sweep. The head K is provided at its inner end with a threaded socket *k'*, in which the threaded shank of the sweep is secured, the head being held against turning on the shank by a transverse pin $k^2$, passing through the shank and head, as represented in Fig. 1. *l* represents a stud or spindle arranged at the opposite end of the head K, and which is journaled in a central opening or bearing formed in the threaded stem *f* of the ratchet-ring F, the spindle being confined in said opening by a washer *l'*, secured to the outer end of the spindle and bearing against the adjacent end of the threaded stem, as represented in Figs. 1 and 7. The outer portion of the head K is recessed or inclined on opposite sides, as represented at *m* in Figs. 1, 4, 5, and 6, and in these recesses are arranged two pawls or dogs *n n'*, which are adapted to engage with an annular row of ratchet-teeth *o*, formed in the ring or chamber F lengthwise of the latter. The pawls *n n'* are pivoted to the head K by pivots or studs formed at the inner portions of the pawls and seated in openings or recesses formed in the adjacent solid portions of the head, as represented by dotted lines in Fig. 1.

*p* represents a transverse spiral spring interposed between the inner sides of the pawls *n n'* and arranged in an opening *p'*, formed in the central recessed portion of the head K. This spring tends to press the pawls outwardly, so as to hold the same in engagement with the teeth of the surrounding ratchet-ring.

Q represents a shifting ring turning upon the inner portion of the cylindrical head K and arranged between the ratchet-ring F and a collar *r*, secured to the inner end of the head.

The pawls *n n'* are of sufficient length to project with their inner portions into the shifting ring Q, as represented in Fig. 1. This shifting ring is provided on its inner side with lugs or projections *q q'*, arranged diametrically opposite each other, and which move the pawls *n n'*, respectively, out of engagement with the ratchet-teeth of the chamber F upon turning the shifting ring in one or the other direction. Upon shifting the ring to the position represented in Fig. 4 the lugs do not come in contact with the pawls, but allow the spring to force both pawls outwardly in engagement with the ratchet-ring of the chamber F. In this position of the parts the pawls compel the ratchet-ring and socket E to turn with the head K, forming a rigid connection between the sweep and bit-stock and causing the same to act like an ordinary brace. Upon shifting the ring to the position represented in Figs 5 and 6 the pawl $n$ is thrown out of gear with the ratchet-ring by the lug $q$, while the other pawl is left in engagement therewith. Upon turning the sweep forwardly the pawl $n'$ rides over the ratchet-teeth and does not affect the bit-stock, while upon turning the sweep in the opposite direction the pawl engages against the teeth of the ratchet-ring and compels the stock to rotate with the sweep. Upon shifting the ring in the opposite direction the opposite lug $q'$ throws the other pawl $n'$ out of gear and the pawl $n$ into gear. The pawl $n$ will now ride over the ratchet-teeth upon turning the sweep backwardly and will engage against the teeth and compel the stock to turn with the sweep upon turning the latter forwardly.

$s$ represents a stop or projection arranged near the inner end of the head K within the ratchet-ring and in the path of the lugs $q\ q'$. This stop limits the movement of the shifting ring by either lug striking the stop.

In my improved construction both pawls are moved outwardly by a single spring, whereby the construction of the ratchet mechanism is greatly simplified.

I claim as my invention—

1. The combination, with the head or button of the brace, of a thimble or sleeve secured therein and provided with a shoulder or rim having a transverse slot, the sweep arranged in said thimble and projecting with its end into said transverse slot, and a washer or bearing-plate attached to the end of the sweep and arranged in said slot, substantially as set forth.

2. The combination, with the head provided with a threaded socket, of a thimble or sleeve provided with an annular rim or flange having a transverse slot extending through the thimble and with a threaded nipple engaging in the threaded socket of the head, the sweep arranged with its end portion in the sleeve or thimble and having its end projecting into said transverse slot, and a washer or bearing-plate arranged in said slot and attached to the end of the sweep, substantially as set forth.

3. The combination, with the sweep or crank A, having an annular groove $c'$ and the handle C, of a bushing D, arranged in the bore of the handle and provided with an internal projection engaging in the groove $c'$, a tapering sleeve $d'$, inserted in one end of the bushing, and shoulders $d\ d^2$, formed, respectively, on the bushing and sleeve at opposite ends of the handle, whereby the latter and the bushing are held in place upon the crank, substantially as set forth.

4. The combination, with the barrel or socket E, provided with a longitudinal slot $e$ and an annular rim or head $e'$, having inner beveled faces, of a movable block H, arranged in the slot $e$ and provided with an external screw-thread, a central tapering socket formed in said block to receive the tang of the bit, a rotary sleeve G, surrounding the socket E and block H, and provided with an internal screw-thread engaging with the screw-threaded block H, and gripping-jaws attached to the movable block and provided with outer beveled faces, which engage against the inner beveled faces in the rim of the socket E, substantially as set forth.

5. In a bit-brace, the combination, with the bit-stock provided with a ring F, having internal ratchet-teeth, and a shank or head K, connecting the bit-stock with the brace, of the pawls $n\ n'$, pivoted to opposite sides of the shank K and projecting into the ring F, a spring $p$, whereby both of said pawls are held against the teeth of the ratchet-ring F and form a rigid connection between the shank and bit-stock, and a movable ring Q, surrounding the shank and the pawls and provided with inwardly-projecting lugs $q\ q'$, adapted to engage with said pawls and release either one of said pawls from the teeth of the ratchet-ring, substantially as set forth.

6. In a bit-brace, the combination, with the bit-stock provided with a ring F, having internal ratchet-teeth $o$, and a shank or head K, connecting the bit-stock with the brace, of the pawls $n\ n'$, pivoted to opposite sides of said shank and projecting into the ratchet-ring F, a spiral spring $p$, seated in an opening in the shank and bearing against said pawls for holding said pawls against the teeth of the ratchet-ring, a movable ring Q, surrounding the shank and the pawls and provided with inwardly-projecting lugs $q\ q'$, adapted to engage against said pawls upon turning said ring, and a stop $s$, secured to the shank K and arranged in the path of the lugs $q\ q'$ for limiting the movement of the ring Q, substantially as set forth.

Witness my hand this 19th day of December, 1889.

LEWIS C. WILCOX.

Witnesses:
JNO. J. BONNER,
JAMES MARR.